United States Patent
Harikumar et al.

(10) Patent No.: US 8,151,081 B2
(45) Date of Patent: Apr. 3, 2012

(54) METHOD, SYSTEM AND APPARATUS FOR MEMORY ADDRESS MAPPING FOR SUB-SOCKET PARTITIONING

(75) Inventors: Ajay Harikumar, Bangalore (IN); Tessil Thomas, Karnataka (IN); Biju Puthur Simon, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 12/291,303

(22) Filed: Nov. 7, 2008

(65) Prior Publication Data
US 2009/0164747 A1 Jun. 25, 2009

(30) Foreign Application Priority Data
Dec. 20, 2007 (IN) .......................... 2675/DEL/2007

(51) Int. Cl.
*G06F 12/00* (2006.01)

(52) U.S. Cl. ...................................................... 711/173
(58) Field of Classification Search .................. None
See application file for complete search history.

(56) References Cited

U.S. PATENT DOCUMENTS

| | | | |
|---|---|---|---|
| 6,633,967 B1 * | 10/2003 | Duncan .......................... 711/207 |
| 7,721,148 B2 * | 5/2010 | Brenden et al. .................. 714/11 |
| 7,853,755 B1 * | 12/2010 | Agarwal et al. ................ 711/141 |
| 2008/0134191 A1 * | 6/2008 | Warrier et al. .................. 718/104 |
| 2009/0164730 A1 | 6/2009 | Harikumar et al. |
| 2009/0164739 A1 | 6/2009 | Harikumar et al. |
| 2009/0164751 A1 | 6/2009 | Harikumar et al. |

* cited by examiner

Primary Examiner — Hiep Nguyen
(74) Attorney, Agent, or Firm — Trop, Pruner & Hu, P.C.

(57) ABSTRACT

Sub-socket partitioning is enabled using embodiments of the present invention. In one aspect, the memory mapping is performed to isolate memory access for each of the partitions by assigning a partition address and a generated physical address.

15 Claims, 7 Drawing Sheets

METHOD, SYSTEM AND APPARATUS FOR MEMORY ADDRESS MAPPING FOR SUB-SOCKET PARTITIONING

CROSS-REFERENCE TO RELATED APPLICATION

Pursuant to 35 U.S.C. §119, this application claims priority to Indian Application Serial No. 2675/DEL/2007, filed Dec. 20, 2007, the subject matter of which is incorporated herein by reference.

The present application is related to and may incorporate embodiments from three concurrently filed applications by the same set of inventors. The first application, is titled "METHOD, APPARATUS, AND SYSTEM FOR SHARED CACHE USAGE TO DIFFERENT PARTITIONS IN A SOCKET WITH SUB-SOCKET PARTITIONING", Ser. No. 12/291,273, filed concurrently herewith. The second application, is titled "METHOD, SYSTEM AND APPARATUS FOR MAIN MEMORY ACCESS SUBSYSTEM USAGE TO DIFFERENT PARTITIONS IN A SOCKET WITH SUB-SOCKET PARTITIONING", Ser. No. 12/291,306, filed concurrently herewith. The third application, is titled "METHOD, SYSTEM AND APPARATUS FOR HANDLING EVENTS FOR PARTITIONS IN A SOCKET WITH SUB-SOCKET PARTITIONING", Ser. No. 12/291,272, filed concurrently herewith.

BACKGROUND

Embodiments of the invention relate to the field of partitioning, and according to one embodiment, a method and apparatus, and system for memory address mapping for sub-socket partitioning.

As modern microprocessors become increasingly faster with growing number of cores, it becomes feasible from a performance viewpoint to run multiple operating systems on the same hardware. This ability opens up many possibilities including Server consolidation and ability to run services Operating Systems in parallel to the main Operating System. Providing this ability can be done either in software or in hardware. In software it is done using virtualization mechanisms by running a Virtual Machine Monitor (VMM) underneath the Operating Systems. However, the present software schemes adversely impact performance for handling system events. The present partitioning hardware schemes partition only down to a socket granularity, hence, this precludes partitioning down to a particular core within the processor or socket.

As previously discussed, different operating systems may operate within the same system. Accordingly, memory may be apportioned between the operating systems, such that each operating system has its own dedicated resources, such as memory, input/output (I/O), memory-mapped hardware configuration information, etc. (generically referred to as "memory address space").

One prior art technique for managing the memory between two or more operating systems running on one or more processors is to physically separate the memory accessed by each operating system. However, this can cause system cost to increase and may require extra devices or other hardware in a computer system, thereby increasing power consumption of the system.

BRIEF DESCRIPTION OF THE DRAWINGS

The invention may best be understood by referring to the following description and accompanying drawings that are used to illustrate embodiments of the invention.

DETAILED DESCRIPTION

Figure 1:
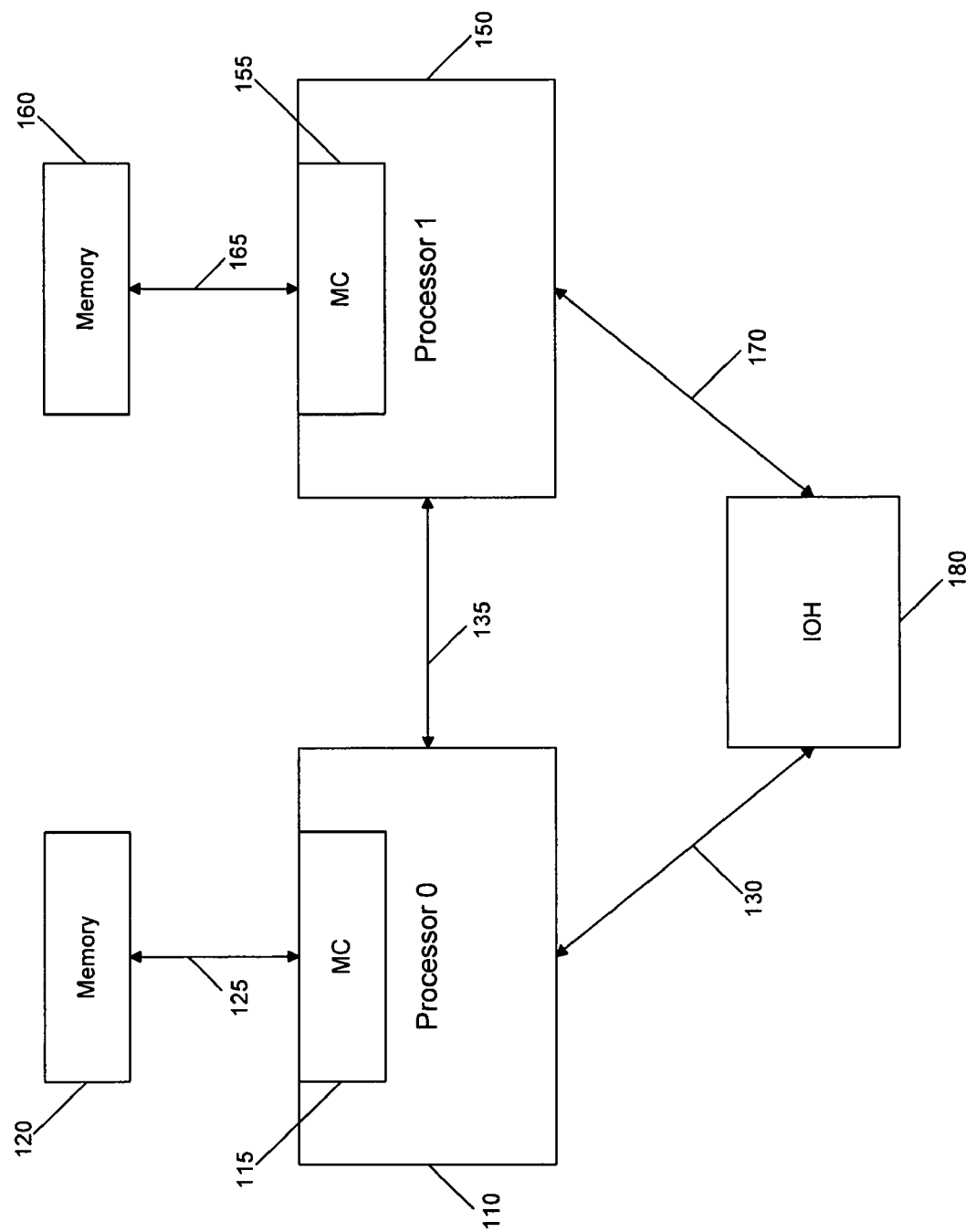
FIG. 1 is an exemplary block diagram of a system in accordance with one embodiment of the invention is shown.

In one embodiment, at least two different operating systems may operate within each socket, such that, one or more cores are running different operating systems. Hence, "sub-socket partitioning" allows multiple partitions to utilize different operating system within each socket. The claimed subject matter facilitates memory mapping for isolating memory access for each of the partitions.

In the following description, certain terminology is used to describe features of embodiments of the invention. For example, the term "device" or "agent" is general and may be used to describe any electrical component coupled to a link. A "link or interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology).

The term "home agent" is broadly defined as a device that provides resources for a caching agent to access memory and, based on requests from the caching agents, can resolve conflicts, maintain ordering and the like. The home agent includes a tracker and data buffer(s) for each caching agent as described below. A "tracker" is dedicated storage for memory requests from a particular device. For instance, a first tracker may include a plurality of entries associated with a first caching agent while a second tracker may include other entries associated with a second caching agent. According to one embodiment of the invention, the "caching agent" is generally a cache controller that is adapted to route memory requests to the home agent.

The term "logic" is generally defined as hardware and/or software that perform one or more operations such as controlling the exchange of messages between devices. When deployed in software, such software may be executable code such as an application, a routine or even one or more instructions. Software may be stored in any type of memory, normally suitable storage medium such as (i) any type of disk including floppy disks, magneto-optical disks and optical disks such as compact disk read-only memories (CD-ROMs), compact disk rewritables (CD-RWs), digital versatile disks (DVDs), (ii) any type of semiconductor devices such as read-only memories (ROMs), random access memories (RAMs), erasable programmable read-only memories (EPROMs), flash memories, electrically erasable programmable read-only memories (EEPROMs), (iii) magnetic or optical cards, or (iv) any other type of media suitable for storing electronic instructions.

In the following description, numerous specific details are set forth. However, it is understood that embodiments of the invention may be practiced without these specific details. In other instances, well-known circuits, structures and techniques have not been shown in detail in order not to obscure the understanding of this description.

Referring to FIG. 1, an exemplary block diagram of a system in accordance with one embodiment of the invention is shown. Herein, FIG. 1 depicts a dual processor (DP) configuration with processors 110 and 150. For instance, this configuration may be associated with a desktop or mobile computer, a server, a set-top box, personal digital assistant (PDA), alphanumeric pager, cellular telephone, or any other type of wired or wireless communication devices.

Each processor 110 and 150 includes a memory controller (MC) 115 and 155 to enable direct communications with an associated memory 120 and 160 via links 125 and 165, respectively. Moreover, the memories 120 and 160 may be independent memories or portions of the same shared memory.

As specifically shown in FIG. 1, processors 110 and 150 are coupled to an input/output hub (IOH) 180 via point-to-point links 130 and 170, respectively. IOH 180 provides connectivity between processors 110 and 150 and input/output (I/O) devices implemented within DP system 100. In addition, processors 110 and 150 are coupled to each other via a point-to-point link 135. According to one embodiment of the invention, these point-to-point links 130, 135, 170 may be adapted to operate in accordance with "Quickpath" specification developed by Intel Corporation of Santa Clara, Calif. However, the claimed subject matter is not limited to a Quickpath link and may utilize any type of link or interconnect. One skilled in the art appreciates the utilization of any link or interconnect scheme that is customized for the particular design requirements. For example, one may use any coherent or non coherent link or interconnect protocol, such as, but not limited to Peripheral Component Interconnect (PCI, PCIe, etc.), a front side bus (FSB), etc.

Figure 2:
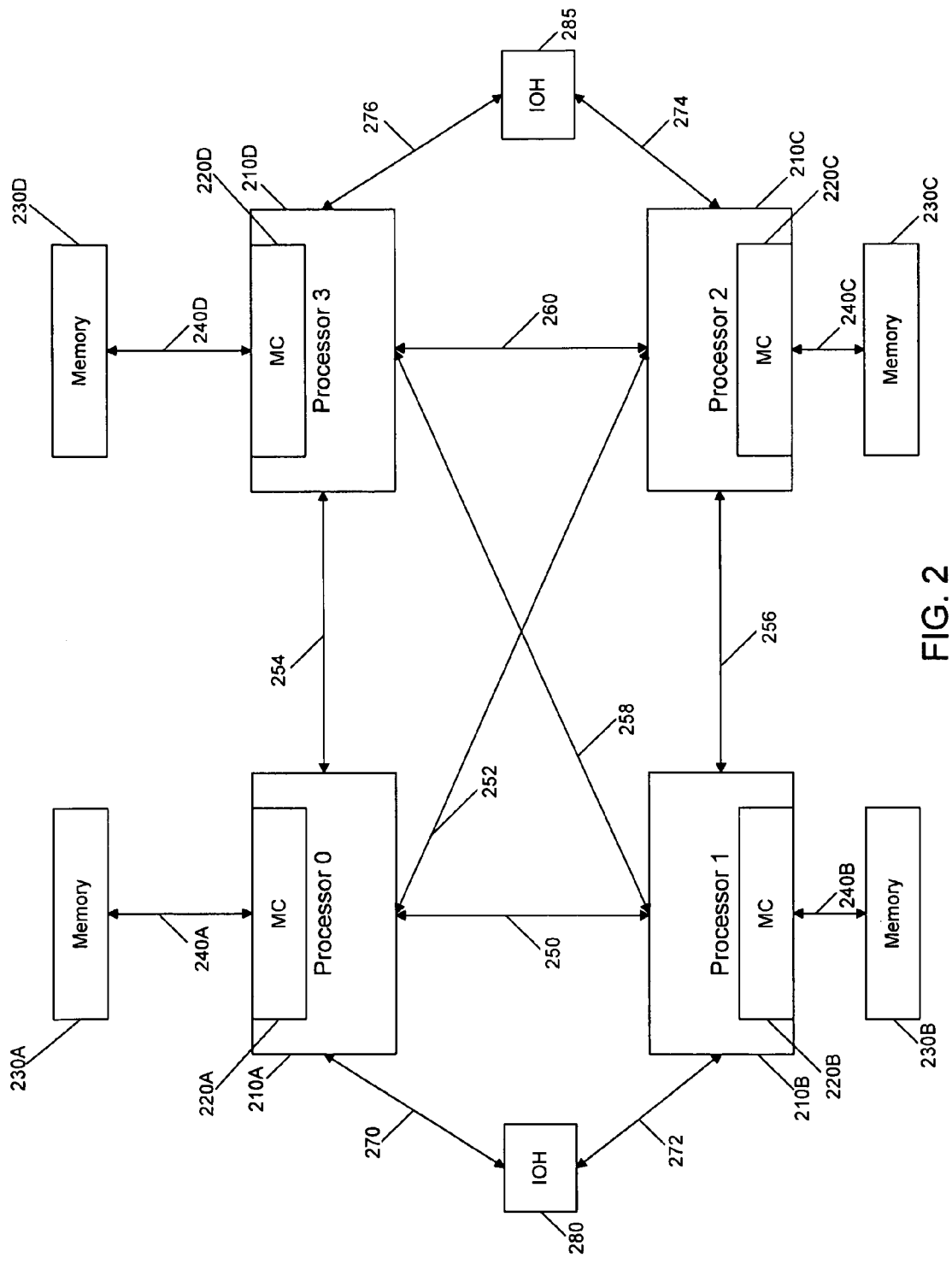
FIG. 2 is an exemplary block diagram of a multiprocessor (MP) system in accordance with one embodiment of the invention is shown.

Referring now to FIG. 2, an exemplary block diagram of a multiprocessor (MP) system in accordance with one embodiment of the invention is shown. Similarly, MP system may be a desktop or mobile computer, a server, a set-top box, personal digital assistant (PDA), alphanumeric pager, cellular telephone, or any other type of wired or wireless communication devices.

Herein, according to one embodiment of the invention, MP system comprises a plurality of processors 210A-210D. One or more of processors, such as processors 210A-210D, may include a memory controller (MC) 220A-220D. These memory controllers 220A-220D enable direct communications with associated memories 230A-230D via links 240A-240D, respectively. In particular, as shown in FIG. 2, processor 210A is coupled to memory 230A via a link 240A while processors 210B-210D are coupled to corresponding memories 230B-230D via links 240B-240D, respectively.

Additionally, processor 210A is coupled to each of the other processors 210B-210D via pTp (point-to-point) links 250, 252 and 254. Similarly, processor 210B is coupled to processors 210A, 210C and 210D via pTp links 250, 256 and 258. Processor 210C is coupled to processors 210A, 210B and 210D via pTp links 252, 256 and 260. Processor 210D is coupled to processors 210A, 210B and 210C via pTp links 254, 258 and 260. Processors 210A and 210B are coupled via pTp interconnects 270 and 272 to a first input/output hub (IOH) 280 while processors 210C and 210D are coupled via point-to-point interconnects 274 and 276 to a second IOH 285.

For both systems 100 and 200 described in FIGS. 1 and 2, it is contemplated that the processors may be adapted to operate as a home agent, a caching agent or both, depending on the system architecture selected.

Figure 3:
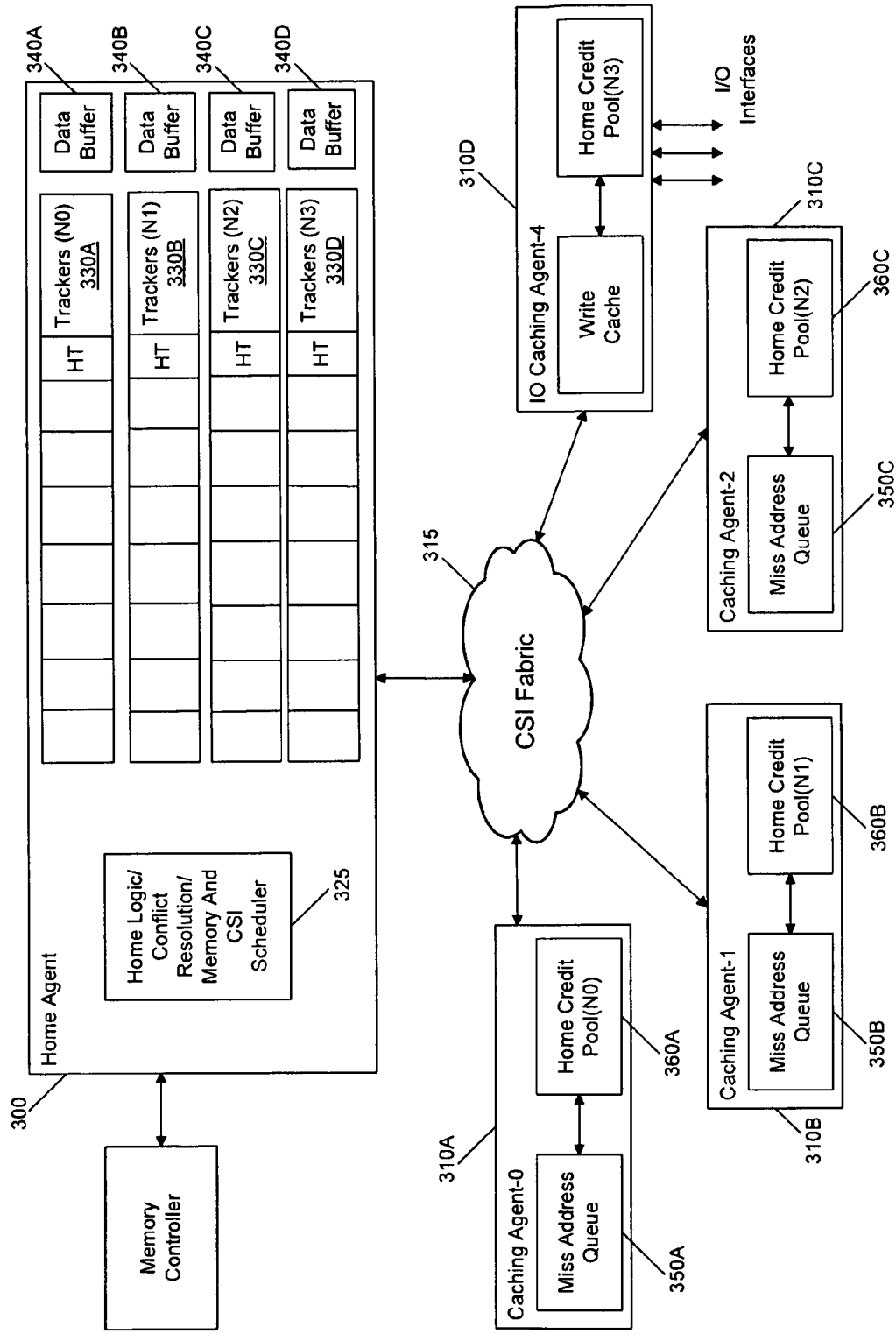
FIG. 3 is an exemplary embodiment of architectures for destination and source devices of the systems of FIGS. 1-2 in accordance with an embodiment of the invention is shown.

Referring now to FIG. 3, an exemplary embodiment of architectures for destination and source devices of the systems of FIGS. 1-2 in accordance with an embodiment of the invention is shown. For illustrative purposes, processor 210D from FIG. 2 (or processor 150 from FIG. 1) is configured as a destination device 300, such as a home agent for example. Processors 210A-210C from FIG. 2 (or processor 110 from FIG. 1) could be configured as sources 310A-310C, such as caching agents for example. IOH 280 or 285 (or IOH 180 of FIG. 1) may be configured as I/O device 310D implementing a write cache 320 operates as a caching agent as well.

As described below, each source 310A, 310B, 310C, or 310D is associated with a tracker that is maintained at destination device 300 and has a predetermined number of tracker entries. The number of tracker entries is limited in size to the number of requests that may be transmitted by any source 310A, 310B, 310C, or 310D that saturates the bandwidth of a PTP fabric 315, which supports point-to-point communications between destination 300 and the plurality of sources (e.g., sources 310A-310D).

As shown in FIG. 3, according to this embodiment of the invention, destination 300 is a home agent that comprises home logic 325 and a plurality of trackers 330$_1$-330M, where $M \geq 1$. In combination with trackers 330$_1$-330M, home logic 325 is adapted to operate as a scheduler to assist in the data transfer of incoming information from memory 230A of FIG. 2 and outgoing information to PTP fabric 315. Moreover, home logic 325 operates to resolve conflicts between these data transfers.

Herein, for this embodiment of the invention, since four (4) caching agents 310A-310D are implemented within system 100/200, four (M=4) trackers are illustrated and labeled "HT-0" 330A, "HT-1" 330B, "HT-2" 330C and "HT-3" 330D. These trackers 330A-330D each contain N0, N1, N2 and N3 tracker entries respectively, where $N_i \geq 1$ (i=1,2,3 or 4). The number of entries (N0-N3) may differ from one tracker to another. Associated with each entry of trackers 330A-330D is a corresponding data buffer represented by data buffers 340A-340D. Data buffers 340A-340D provide temporary storage for data returned from memory controller 220A, and eventually scheduled onto PTP fabric 315 for transmission to a targeted destination. The activation and deactivation of the entries for trackers 330A-330D is controlled by home logic 325 described below.

Caching agents 310A, 310B, and 310C include a miss address queue 350A, 350B, and 350C, respectively. For instance, with respect to caching agent 310A, miss address queue 350A is configured to store all of the miss transactions that are handled by home agent 300.

In addition, according to this embodiment of the invention, caching agents 310A, 310B and 310C further include a credit counter 360A, 360B and 360C, respectively. Each credit counter 360A, 360B, and 360C maintains a count value representative of the number of unused tracker entries in trackers 330A, 330B, and 330C. For instance, when a new transaction is issued by caching agent 310A to home agent 300, credit counter 360A is decremented. If a transaction completes, then credit counter 360A is incremented. At reset time, credit counter 360A is initialized to the pool size equal to the number of tracker entries (N0) associated with tracker 330A. The same configuration is applicable to credit counters 360B-360C.

Also shown in FIG. 3 is an example of caching agent 310D operating as an I/O agent that reads information from memory and writes information to an I/O interface. Alternately, caching agent 310D may stream I/O agent read returns as writes into the main memory. Caching agent 310D implements write cache 320, which is used to sustain high bandwidth while storing data associated with I/O operations.

Figure 4:
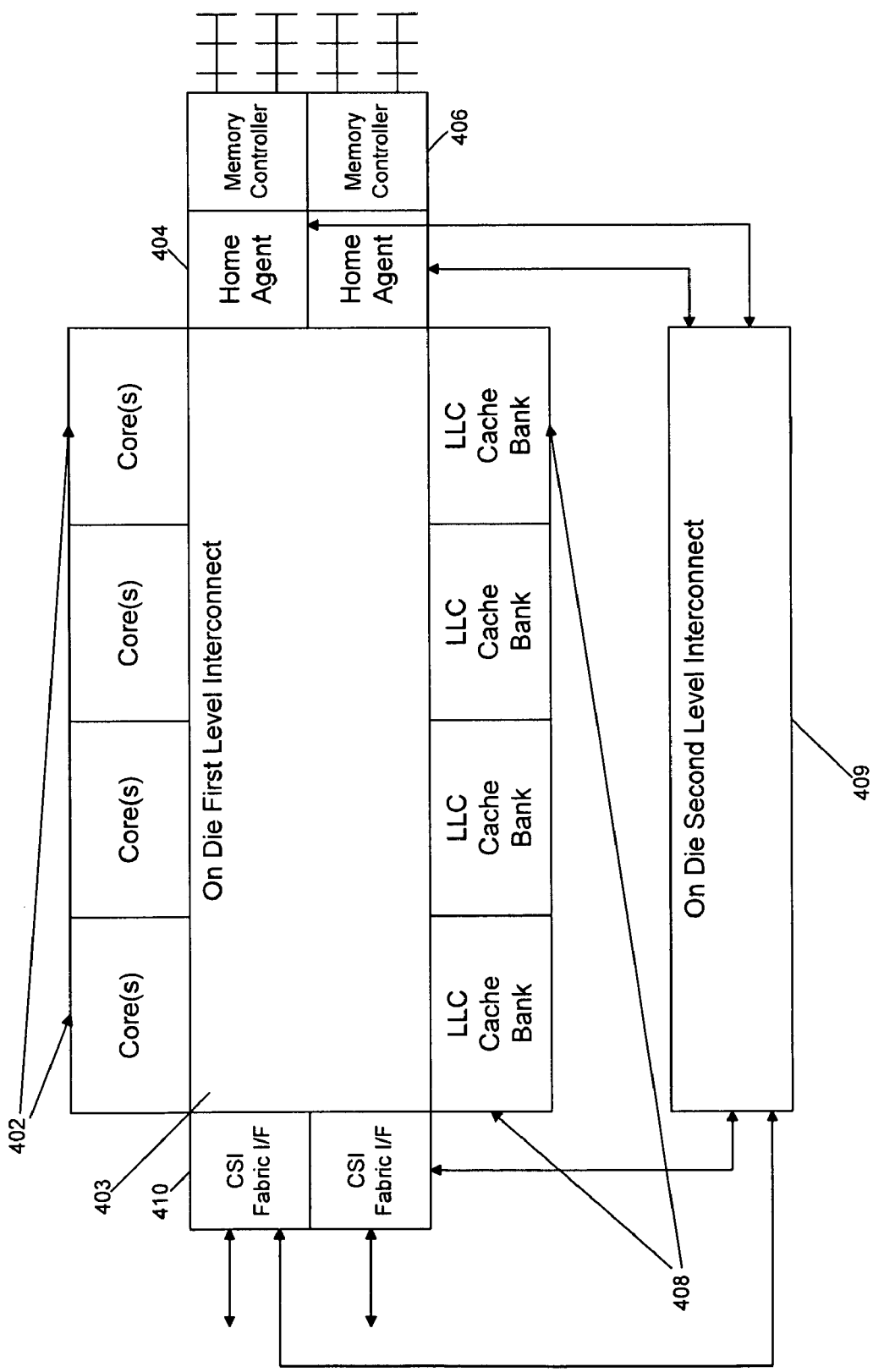
FIG. 4 is a socket architecture in accordance with an embodiment of the invention.

FIG. 4 is a socket architecture in accordance with an embodiment of the invention. In one embodiment, a dual processor system as depicted in the previous figures with each processor socket having processor cores 402. In one embodiment, at least two different operating systems may operate within each socket, such that, one or more cores are running different operating systems. In this embodiment, a partition identifier is assigned to each partition. The cores and the distributed LLC (Last Level Cache banks) 408 are connected to each other within the socket by a first level interconnect 403. In one embodiment, the first level interconnect 403 is an on-die ring interconnect. In anther embodiment, the first level interconnect is a two dimensional mesh/cross bar. The memory controller 406 is integrated into the processor die and a pTp protocol is used for inter-processor communication and IO access. The fabric interfaces 410 and the home agent 404 are also connected to the first level interconnect. The home agents 404 and the fabric interfaces 410 are connected to each other via a second level interconnect 409. In summary, in one embodiment, the first level interconnect may be used to connect the cache memory, home agents and the off chip links to the processor cores, and the second level interconnects are used for connecting the home agent directly to the off chip links. However, the claimed subject matter is not limited to the previous configuration. One skilled in the art appreciates utilizing different configurations to facilitate communication for a particular application or power management scheme.

Figure 5:
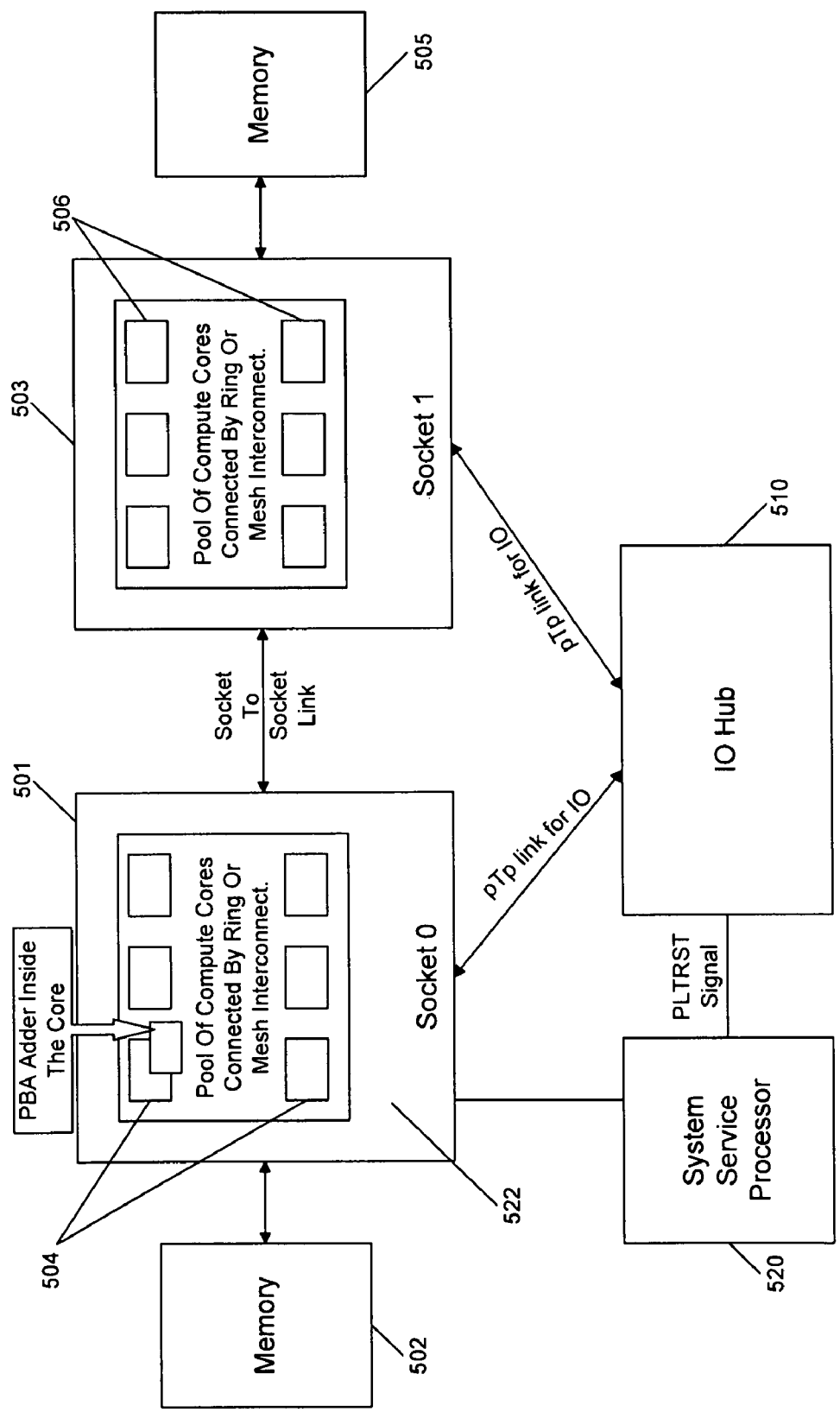
FIG. 5 is a platform architecture in accordance with an embodiment of the invention.

FIG. 5 is a platform architecture in accordance with an embodiment of the invention. In this embodiment, sockets 501 and 503 include a plurality of processor cores, 504 and 506, respectively. In this embodiment, each socket may utilize sub-socket partitioning, such that, each socket is running multiple operating systems with the respective processor cores. In one embodiment, each socket is coupled to a memory. For example, socket 501 is coupled to memory 502 and socket 506 is coupled to memory 505. Also, the sockets 501 and 502 are coupled via a link. In one embodiment, the link is a Quickpath link that adheres the Intel Corporation specification for System Interconnect for Quickpath. In one embodiment, the sockets are coupled to the input/output hub (IOH) 510 via a point to point (pTp) link. Also, a system service processor 520 is coupled to socket 501. In one embodiment, an adder logic 522 is incorporated to facilitate memory address mapping that is discussed in FIGS. 6 and 7.

In one embodiment, a firmware designated as Active Partition Management (APM) that is an Extensible Firmware Interface (EFI) runtime module is responsible for overall system configuration during boot, core and memory allocation and de-allocation during run time, and error flow and RAS (Reliability, Accessibility and Serviceability) management for shared resources during runtime. In one embodiment, this firmware is accessed via EFI calls by the OS/VMM of different partitions.

Figure 6:
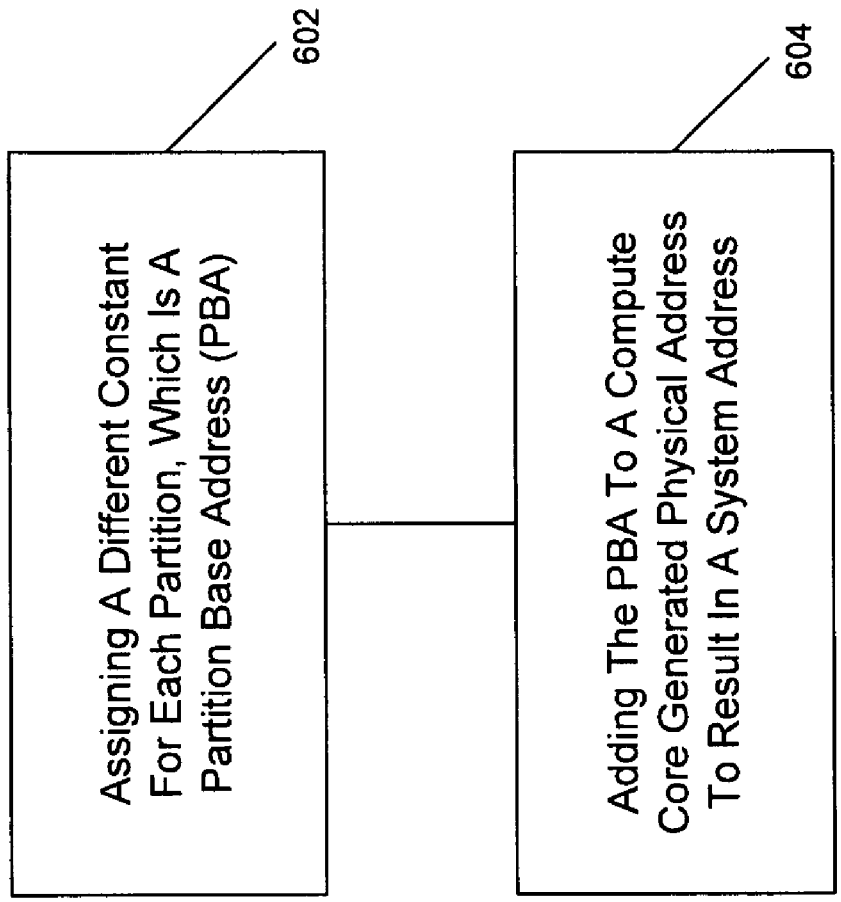
FIG. 6 is a method of a flowchart in accordance with an embodiment of the invention.

FIG. 6 is a method of a flowchart in accordance with an embodiment of the invention. In one embodiment, the method depicts facilitating memory mapping to allow for isolating a memory access for each partition. As illustrated in block 602, assigning a different constant for each partition, which is a partition base address (PBA) is performed. Subsequently, as illustrated in block 604, adding the PBA to a processor generated physical address to result in a system address is performed.

In one embodiment, an adder as depicted in FIG. 5, is employed that automatically adds partition base address to the partition physical address to generate the system address. In one embodiment, the adder resides in each compute core allowing partitioning at the compute core. The value of the partition base address is programmed for each of the core and 10 devices in the partition, by the firmware during boot-up or during SMI, which is System Management Interrupt which is used to enter System Management Mode SMM. SMM is used typically to execute programs transparent to OS. Alternatively, in another embodiment, it can also be set up by microcode depending on the level of protection needed. In one embodiment, firmware selects a Partition Base Addresses (PBA) in such a manner that the address space of the different partitions do not overlap.

Figure 7:
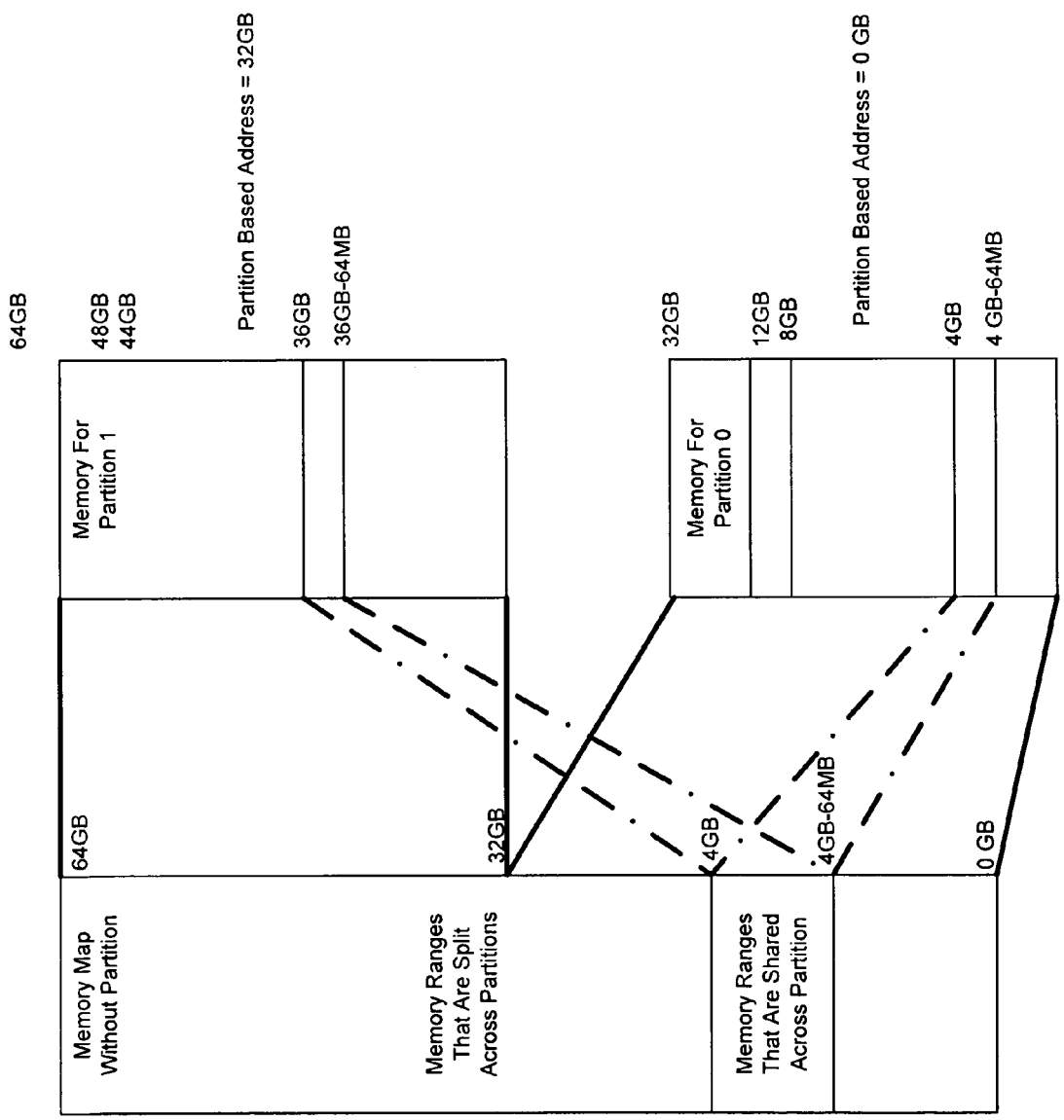
FIG. 7 is a block diagram of a memory mapping in accordance with an embodiment of the invention.

FIG. 7 is a block diagram of a memory mapping in accordance with an embodiment of the invention. In this embodiment, the memory ranges can be split across multiple partitions. In one embodiment, the address ranges are given as system address. The range between 4 GB to 4 GB-64 is shared between the 2 partitions, even though partition 1 alias this to address range 36 GB to 36 GB-64 MB. The remaining range is split such that 0 GB to 32 GB belongs to Partition 0 and memory from 32 GB to 64 GB belongs to Partition 1. The claimed subject matter is not limited to the preceding address ranges or partition numbers. One skilled in the art appreciates utilizing different address ranges and partitions.

Also, the claimed subject matter may be implemented in software. As previously discussed in the figures, firmware was utilized in several embodiments for the memory mapping. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   defining a plurality of partitions within a socket;
   assigning a partition base address for each partition; and
   adding the partition base address to a generated physical address that results in a system address.

2. The method of claim 1 wherein the partition base address is based on assigning a different constant for each partition.

3. The method of claim 1 wherein the generated physical address is a processor generated physical address.

4. The method of claim 1 wherein assigning the partition base address for each partition comprises firmware programming the partition base address for each core and input/output device in the partition.

5. The method of claim 4 wherein the firmware programming selects the Partition Base Addresses (PBA) preventing overlap between the address spaces of different partitions.

6. A system comprising:
   a processor within a socket, the processor having a plurality of cores;
   a dynamic random access memory, coupled to the processor, to receive requests from the processor;
   the processor to support sub-socket partitioning to utilize at least a first operating system and a second operating system within a first partition and a second partition; and
   an adder logic, coupled to one of the plurality of cores, to add a generated partition base address to a partition physical address, to result in a system address.

7. The system of claim 6 wherein the generated partition base address is based on assigning a different constant for each partition.

8. The system of claim 6 wherein the partition physical address is a processor generated physical address.

9. The system of claim 6 wherein the processor is to assign the generated partition base address for each partition by firmware programming the generated partition base address for each core and input/output device in the partition.

10. The system of claim 9 wherein the firmware programming is to select the generated partition base addresses preventing overlap between the address spaces of different partitions.

11. An article of manufacture comprising:
    a machine-readable medium having a plurality of machine readable instructions, wherein when the instructions are executed by a sub-socket partitioning supported system, the instructions to facilitate memory mapping by:
    defining a plurality of partitions within a socket;
    assigning a partition base address for each partition; and
    adding the partition base address to a generated physical address that results in a system address.

12. The article of manufacture of claim 11 wherein the partition base address is based on assigning a different constant for each partition.

13. The article of manufacture of claim 11 wherein the generated physical address is a processor generated physical address.

14. The article of manufacture of claim 11 wherein assigning the partition base address for each partition comprises firmware programming the partition base address for each core and input/output device in the partition.

15. The article of manufacture of claim 14 wherein the firmware programming selects the Partition Base Addresses (PBA) preventing overlap between the address spaces of different partitions.

\* \* \* \* \*